(12) United States Patent
Kornmann et al.

(10) Patent No.: US 8,893,031 B2
(45) Date of Patent: Nov. 18, 2014

(54) VIRTUAL BUSINESS OBJECT NODE ASSOCIATIONS

(75) Inventors: Tim Kornmann, Wiesloch (DE); Gerd M. Ritter, Heidelberg (DE); Dirk Stumpf, Graben-Neudorf (DE); Rene Gross, Heidelberg (DE)

(73) Assignee: SAP SE, Walldorf (DE)

( * ) Notice: Subject to any disclaimer, the term of this patent is extended or adjusted under 35 U.S.C. 154(b) by 21 days.

(21) Appl. No.: 13/328,849

(22) Filed: Dec. 16, 2011

(65) Prior Publication Data

US 2013/0159909 A1 Jun. 20, 2013

(51) Int. Cl.
*G06F 3/048* (2013.01)

(52) U.S. Cl.
USPC ............ 715/771; 715/764; 707/805; 707/802

(58) Field of Classification Search
CPC ................................. G06F 17/30; G06Q 10/10
See application file for complete search history.

(56) References Cited

U.S. PATENT DOCUMENTS

| | | | |
|---|---|---|---|
| 6,023,271 A * | 2/2000 | Quaeler-Bock et al. ...... | 715/866 |
| 7,783,667 B2 * | 8/2010 | Scheerer et al. ............. | 707/791 |
| 7,925,658 B2 * | 4/2011 | Colaco et al. ................. | 707/756 |
| 8,239,371 B2 * | 8/2012 | Wintel et al. ................. | 707/713 |
| 2005/0138057 A1 * | 6/2005 | Bender et al. ................. | 707/102 |
| 2008/0147421 A1 * | 6/2008 | Buchmann et al. ............. | 705/1 |
| 2009/0063490 A1 * | 3/2009 | Fuerst et al. ..................... | 707/9 |
| 2009/0112666 A1 * | 4/2009 | Guo et al. ......................... | 705/7 |
| 2009/0125531 A1 * | 5/2009 | Scheerer et al. ............. | 707/100 |
| 2010/0049734 A1 * | 2/2010 | Wintel et al. ............. | 707/103 R |
| 2010/0162147 A1 * | 6/2010 | Ritter et al. ................... | 715/764 |

* cited by examiner

*Primary Examiner* — Matt Kim
*Assistant Examiner* — Mahelet Shiberou
(74) *Attorney, Agent, or Firm* — Buckley, Maschoff & Talwalkar LLC

(57) ABSTRACT

A computer-implemented system may include reception of an instruction to create an association for an element of a UI component model, determination of a first business object model of the association, determination of a second business object model of the association, definition of foreign key parameters associating an attribute of the first business object model with an attribute of an element of the second business object model, reception of an instruction to bind the element of the UI component model to a second attribute of the element of the second business object model, and creation of metadata in the UI component model associating the element of the UI component model with the second attribute of the element of the second business object model, the metadata comprising the foreign key parameters.

15 Claims, 10 Drawing Sheets

VIRTUAL BUSINESS OBJECT NODE ASSOCIATIONS

FIELD

Some embodiments relate to object model-based enterprise applications. More specifically, some embodiments relate to the modeling of associations between object models.

BACKGROUND

According to a service-oriented architecture, a backend service layer provides services (i.e., business functionality) to service consumers, typically via Web protocols. FIG. 1 is a block diagram illustrating one such scenario. Typical service consumers use this business functionality to provide user interfaces, application-to-application or business-to-business integration, output management (e.g., printing), spreadsheet download, etc. Service consumers of different types, or even of a same type, may access the backend service layer in different ways. Therefore, the services are not particularly adapted to the requirements of any particular service consumer.

One such service consumer may comprise a user interface client application. A user interface client application may conform to a data model which is suited to implementation of a user interface. For example, the data model may define various UI elements, such as drop-down menus, trees, and fact sheets. A developer adds these UI elements to screen layout patterns and binds the elements to entities of the backend service layer, and then develops user interface logic (e.g., logic for computing user interface indicators or coloring/hiding fields) in terms of the user interface data model.

The entities of the backend service layer to which the UI elements are bound are business objects, which expose their data in a complex, normalized data tree consisting of nodes containing attributes, actions (i.e., executing business logic on a node) and associations to other nodes. Data for a UI element which is bound to a business object is retrieved based on the associated nodes of the business object.

FIG. 2 illustrates the above-mentioned binding and association. The List Node element of the UI component model is populated with data from the Item element of business object A, and the Structure A element of the UI component model is populated with data from the Sub-Item A node of business object A. For each main business object node referenced by a UI component data model, a corresponding runtime business object node implementation exists. This implementation executes changes on the corresponding node but also retrieves the node's data based upon change notifications or explicit read requests.

Data retrieval service calls are therefore organized alongside a complex tree of business object nodes. In order to traverse the node tree, a retrieval mechanism relies on modeled associations between different business object nodes, especially when nodes of other business objects are joined into the tree. For example, if a UI component model binds to an Item node of business object A and to an Item node of business object B, a cross-BO business object association from business object A Item to business object B Item must exist to ensure proper data retrieval.

FIG. 3 illustrates a cross-BO business object association as modeled within the business objects themselves. The association relies on a modeled foreign key (e.g., Item node of business object A contains a key attribute of Item node of business object B or vice versa). Accordingly, when such an association is used to read data, the backend service layer will use the foreign key information in order to load the Item node of business object B based upon the Item node of business object A.

As also illustrated in FIG. 3, intra-business object associations may similarly define a link from a parent business object node to a sub-node having a dedicated role.

More specifically, if a 0 . . . n sub-node can contain one instance with a specific role, its parent node may directly link to this instance via a dedicated association representing the role's semantic. In one example, an Item node contains an ItemParty node which in turn may include party instances of different types (e.g., Supplier, Account, . . . ). If the parent node needs to link to one particular party instance, an intra-business object association which represents the role is created in the business object metadata. When this association is followed during data retrieval, the service layer will only return the relevant instance, if it exists.

Not all intra- or cross-business object associations are modeled. For example, a node of business object A might link to n different business objects and nodes, depending on its foreign key and the type information. All possible associations are not modeled because such an approach would quickly overwhelm the governing model. In another instance, an association between a node of business object A and a node of business object B may be deemed desirable. However, business object A resides in a lower software logistics layer than business object B and is unaware of the higher layer due to deployment concerns.

DETAILED DESCRIPTION

Figure 1:
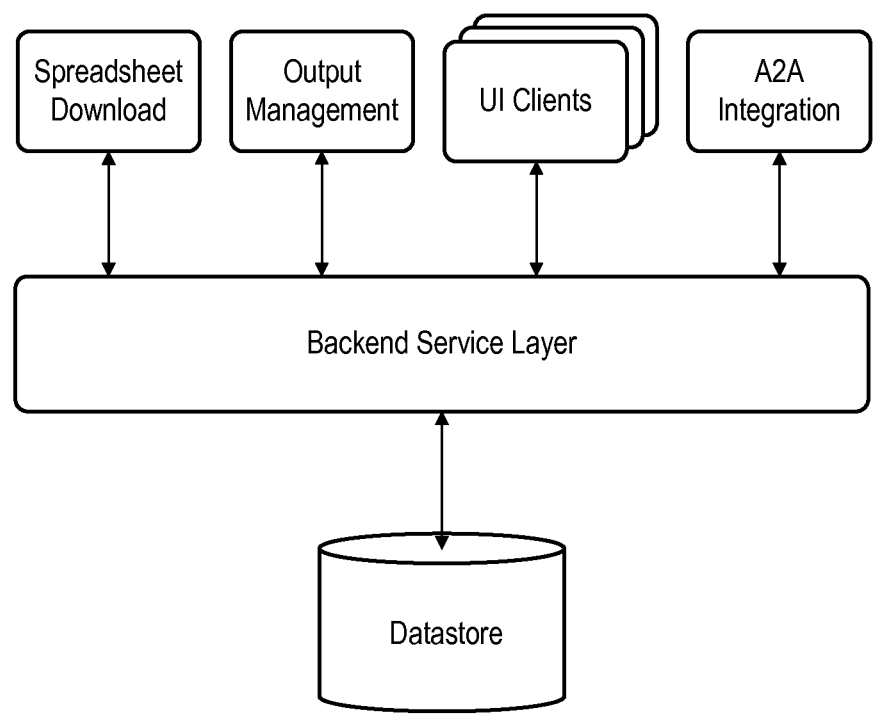
FIG. 1 is a block diagram of a system.
Figure 2:
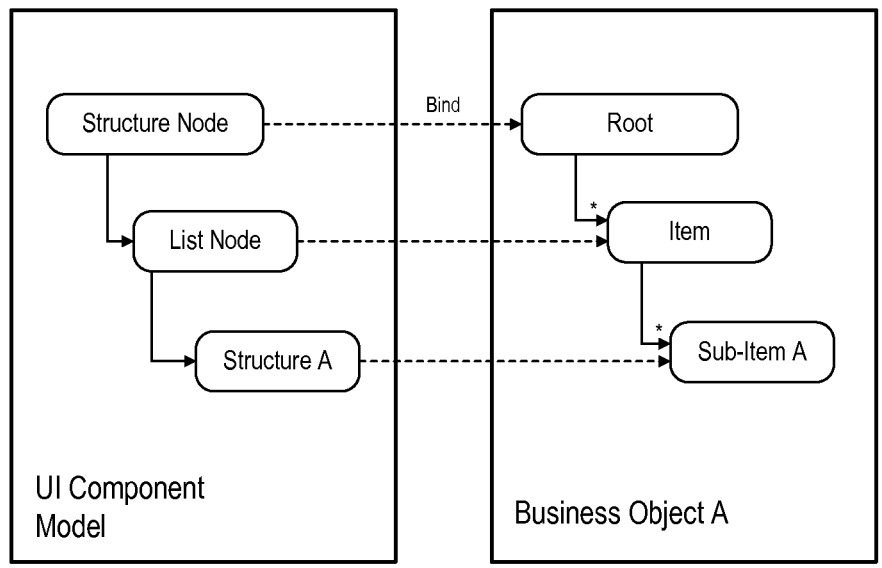
FIG. 2 is a block diagram of a UI component model to business object binding.
Figure 3:
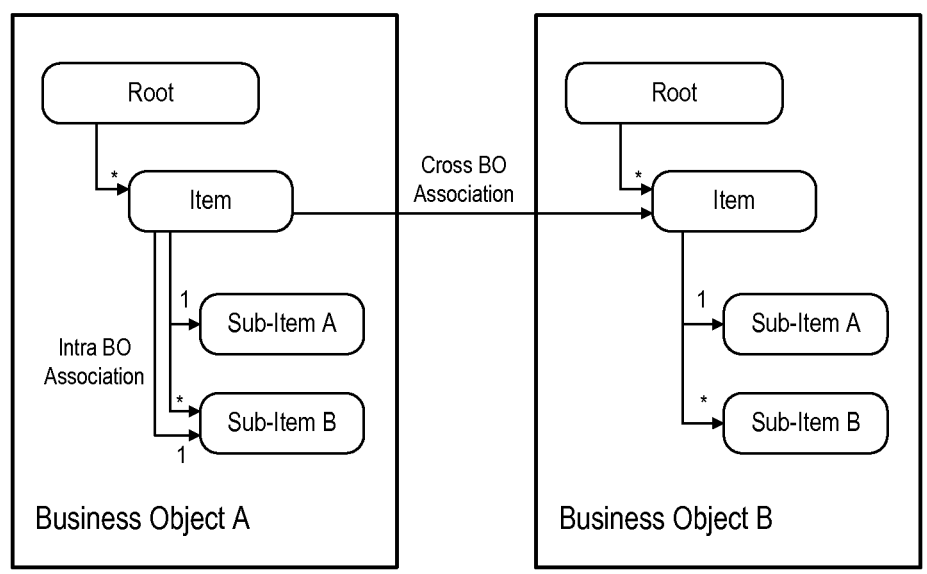
FIG. 3 is a block diagram illustrating business object-modeled associations.
Figure 4:
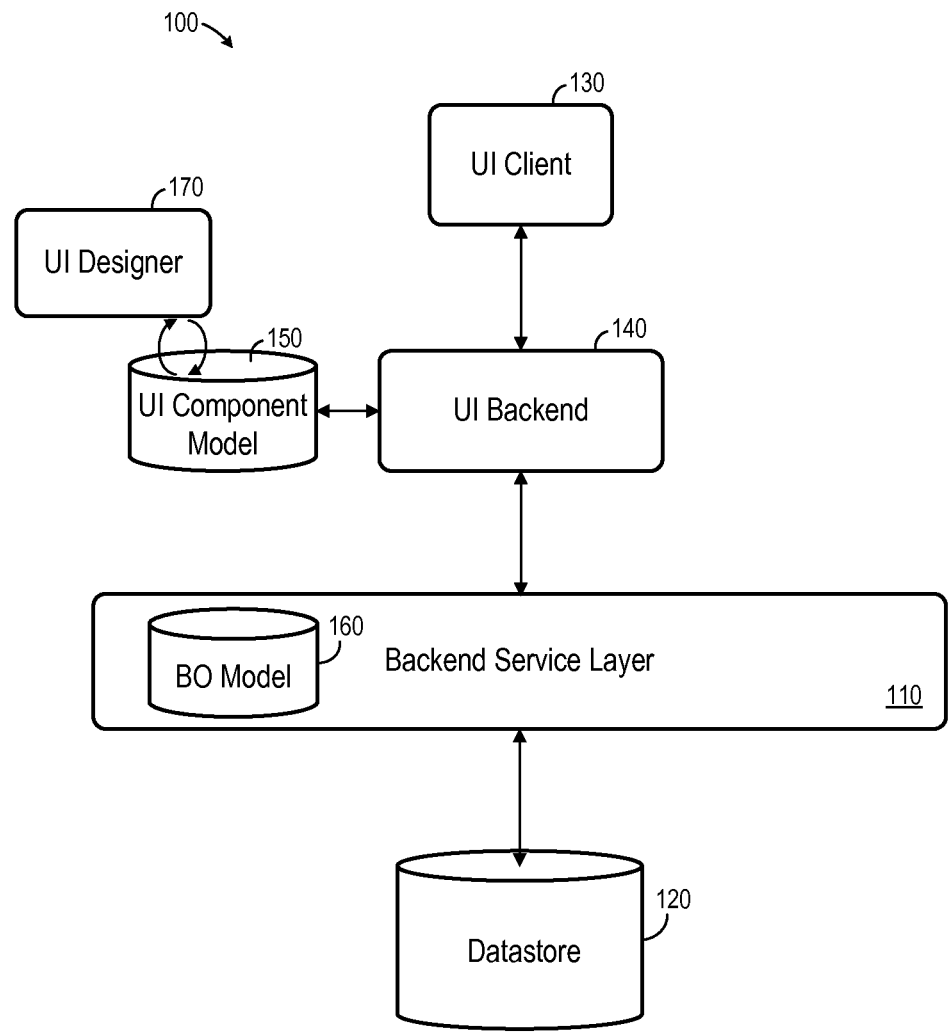
FIG. 4 is a block diagram of a system according to some embodiments.

FIG. 4 is a detailed block diagram of system 100 according to some embodiments. System 100 includes backend service layer 110, datastore 120, user interface (UI) client 130, UI backend 140, UI component model 150, business object model 160 and UI designer 170. FIG. 4 represents a logical architecture for describing some embodiments, and actual implementations may include more or different logical entities arranged in any manner.

Backend service layer 110 may comprise an enterprise services infrastructure and/or any implementation for providing business functionality. The primary entities of backend service layer 110 are "business objects", which are software models defined by metadata of business object model 160 and representing real-world entities involved in business transactions. For example, a business object may represent a business document such as a sales order, a purchase order, or an invoice. A business object may also represent master data objects such as a product, a business partner, or a piece of equipment. Particular documents and master data objects (e.g., SalesOrder SO4711, ACME corporation) are represented by instances of their representing business object, or business object instances.

Backend service layer 110 may provide services to one or more service consumers by executing processes conforming to business object model 160. According to the illustrated embodiment, the services may include retrieving, creating, modifying and/or deleting the data of business object instances stored in datastore 120. Datastore 120 may comprise any one or more systems to store business data. Such systems include, but are not limited to, relational database systems, Online Analytical Processing (OLAP) database systems, data warehouses, application servers, and flat files.

UI designer 170 may be operated by a developer to design user interfaces based on UI component model 150. UI component model 150 may be suited to implementation of a user interface. For example, UI component model 150 may define various UI elements, such as drop-down menus, trees, and fact sheets. As mentioned above, the developer adds these UI elements to screen layout patterns and binds the elements to elements of business object model 160. This binding is used by backend service layer 110 to manage the transmission of data to and from UI backend 140.

UI client 130 comprises an application to render user interfaces which were designed based on UI component model 150. That is, specific drop-down menus, trees, fact sheets, etc. rendered by UI client 130 according to a user interface are instances of their corresponding objects defined in UI component model 150. UI client 130 also receives user input (e.g., modification of data within a displayed field, selection of an item from a drop-down menu, selection of a checkbox, etc.) and, in response, transmits a corresponding UI request to UI backend 140. UI client 130 may execute, for example, within a Web browser.

According to some embodiments, UI client 130 is located at a client or user site, while the other elements of system 100 are housed at a provider site and may provide services to other UI clients located at the same or another user site. The other elements need not always be accessible to UI client 130. That is, UI client 130 may operate in an "offline" mode.

UI backend 140 provides communication between UI client 130 and backend service layer 110. Generally, UI backend 140 receives a UI request which conforms to UI component model 150 from UI client 130, communicates with backend service layer 110 to fulfill the request, and provides a response which conforms to UI component model 150 to UI client 130.

As will be described below, UI designer 170 may be used to define cross-business object and/or intra-business object associations within the metadata of UI component model 150. UI backend 140 and/or service layer 110 may leverage these associations to populate an element of a UI component with data of two business objects (or, in the case of an intra-business object association, with data of a selected sub-node instance (as opposed to data of the entire parent node), even if a corresponding association is not modeled within the metadata of business object model 160.

Figure 5:
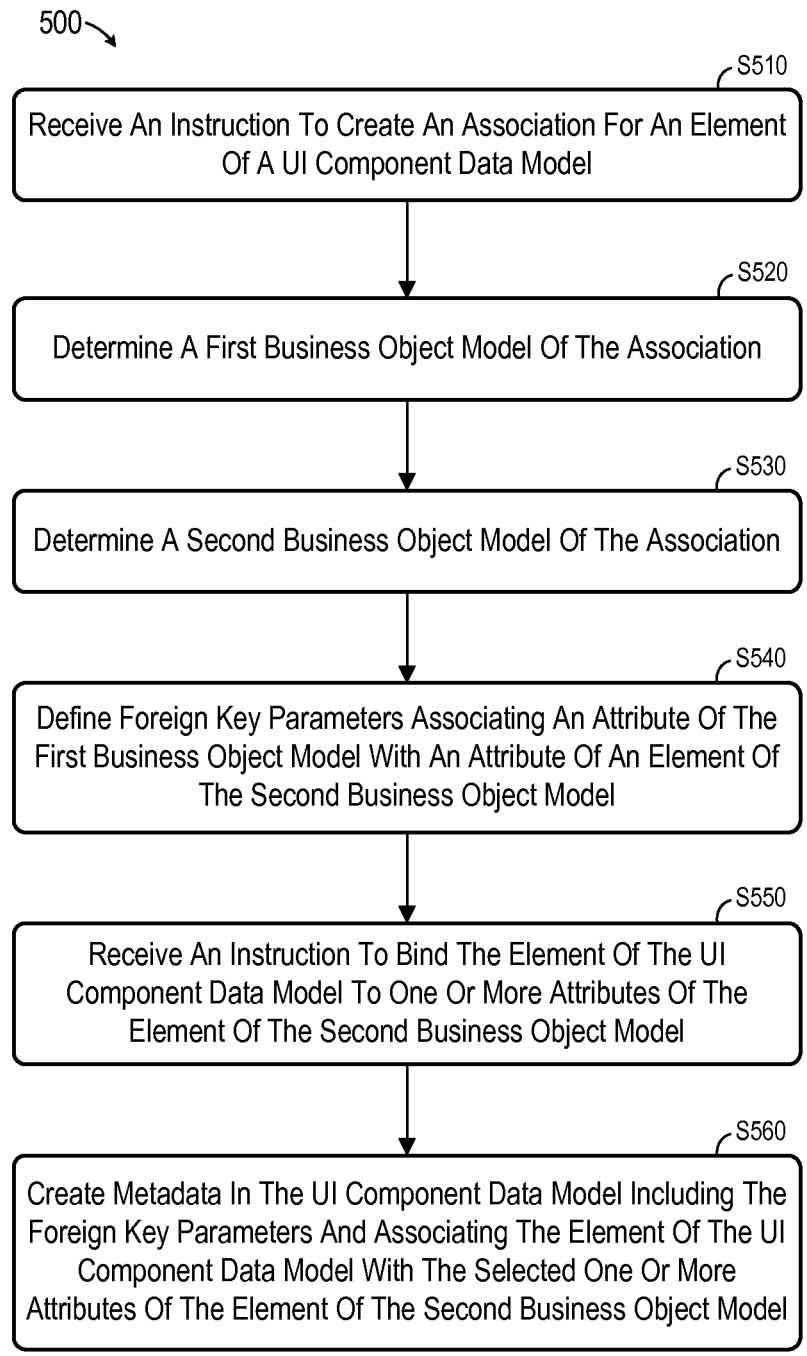
FIG. 5 is a flow diagram of process steps according to some embodiments.

FIG. 5 comprises a flow diagram of process 500 according to some embodiments. In some embodiments, one or more computing devices of an enterprise service provider execute program code to perform process 500. Process 500 may facilitate the design of a cross-business object association in a UI component data model by modeling a foreign key relationship from one business object's element to another business object's element.

All processes mentioned herein may be embodied in processor-executable program code stored on one or more of non-transitory computer-readable media, such as a fixed disk, a floppy disk, a CD-ROM, a DVD-ROM, a Flash drive, and a magnetic tape. In some embodiments, hard-wired circuitry may be used in place of, or in combination with, program code for implementation of processes according to some embodiments. Embodiments are therefore not limited to any specific combination of hardware and software.

Initially, at S510, an instruction is received to create an association for an element of a UI component data model. According to the present example, the association will be between an element of a first business object model and an element of a second business object model. In some embodiments, the association may be between an element of a first business object model and a second element of the first business object model (i.e., an intra-business object association). Referring to the FIG. 4 example, such an instruction may be received at S510 from a developer operating UI designer 170.

Figure 6:
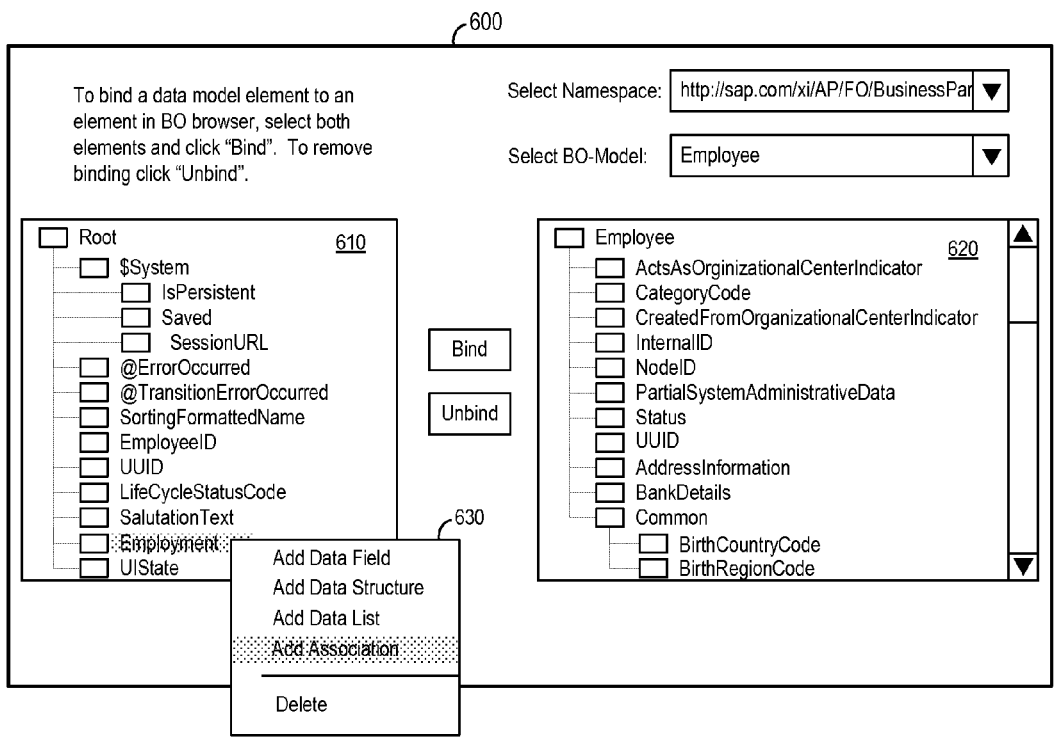
FIG. 6 illustrates a user interface for modeling a cross-business object association within a UI component model to some embodiments.

FIG. 6 is an outward view of user interface 600 for receiving the instruction at S510 according to some embodiments. A computing device may display user interface 600 by executing program code of UI designer 170. The UI component model element Employment has been created as shown in window 610 and is not currently bound to any business object element shown in window 620.

The user has "right-clicked" on the Employment element of window 610, resulting in display of context menu 630. The user has also selected "Add Association" from context menu 630, and this selection comprises the instruction received at S510. The first object model of the association is then determined at S520. According to the present example, the first object model of the association is the Employee business object model because this business object model is currently selected in user interface 600.

Figure 7:
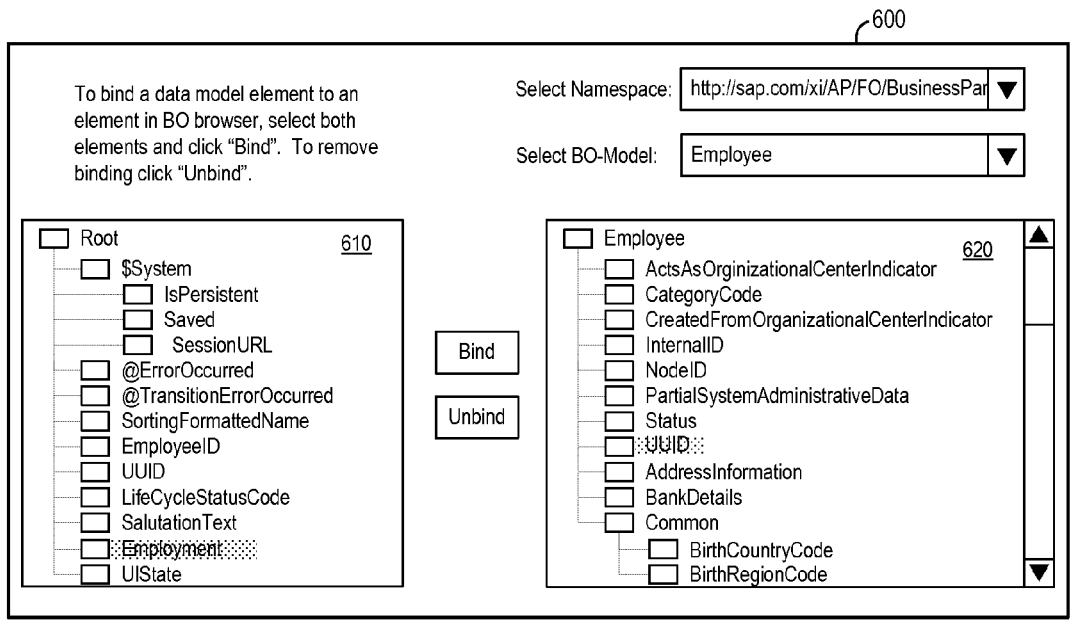
FIG. 7 illustrates user interfaces for modeling a cross-business object association within a UI component model to some embodiments.
Figure 7:
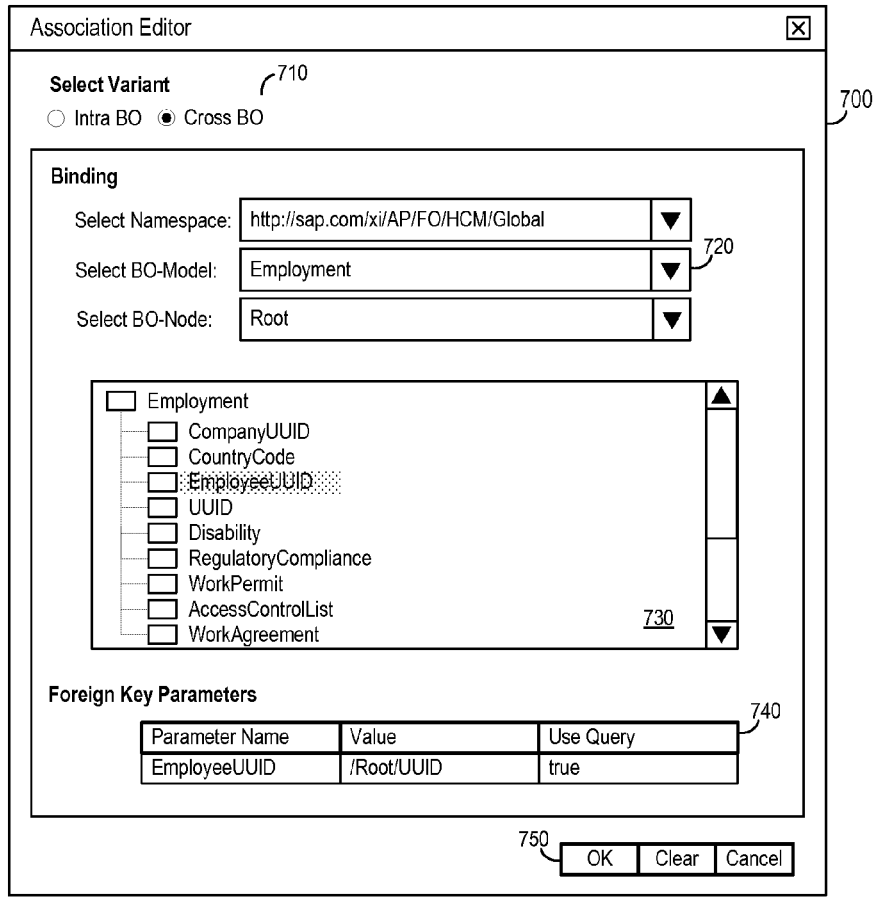

FIG. 7 illustrates user interface 700, which is presented along with user interface 600 in response to selection of "Add Association". Area 710 of interface 700 allows a user to select whether the new association to be defined in the metadata of the UI component data model is an intra-business object association or a cross-business object association. For the present example, it will be assumed that the new association is a cross-business object association. Accordingly, a second business object model of the cross-business object association is determined at S530.

In the FIG. 7 example, the second business object model is determined via user manipulation of drop-down field 720. As shown, the user has selected the Employment business object model in drop-down field 720, causing display of the elements of the Employment business object model in window 730.

Next, foreign key parameters are defined at S540. The parameters associate an attribute of the first business object model with an attribute of the second business object model. Continuing with the present example, user interface 600 of FIG. 7 depicts selection of the root node attribute UUID of the Employee business object model and user interface 700 depicts selection of the root node attribute EmployeeUUID of the Employment business object model. Table 740 of interface 700 displays the thusly-defined foreign key parameters.

Figure 8:
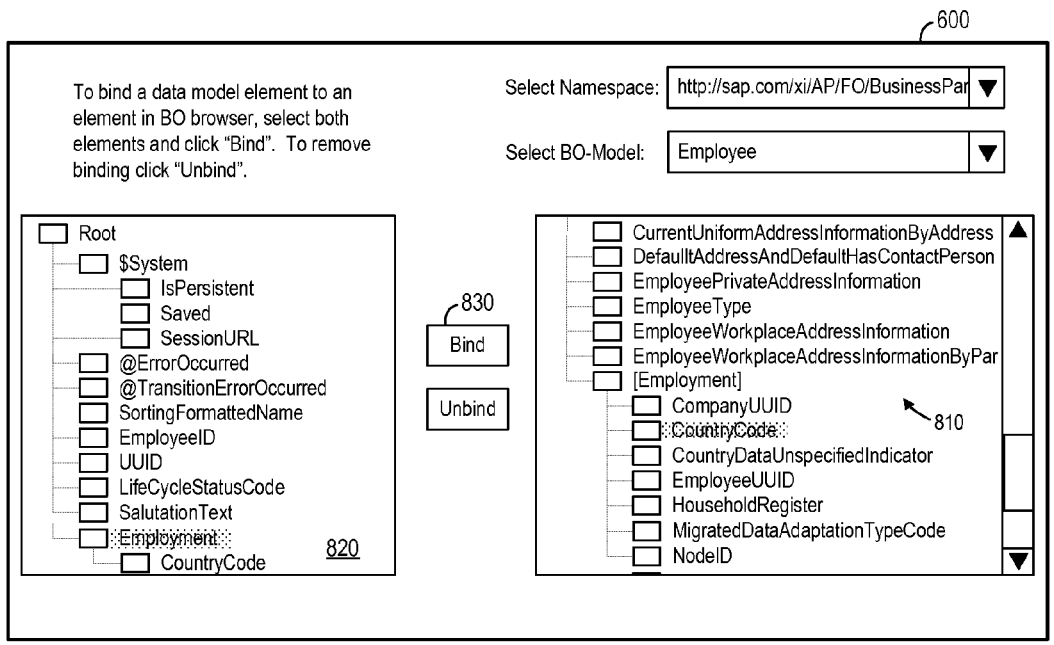
FIG. 8 illustrates a user interface depicting a cross-business object association within a UI component model to some embodiments.

The user may then select OK control 750 to create the association. FIG. 8 illustrates the association in business object tree 810 by displaying the root node of the second business object model (i.e., Employment) within brackets. Therefore, the user may input an instruction at S550 to bind attributes of the node to a UI component model element. In the illustrated example, a user has selected the attribute CountryCode of tree 810 and the UI element Employment within window 820, and has thereafter selected Bind control 830.

Metadata is created in the UI component data model at S550 in response to such an instruction. The metadata associates the UI element (i.e., Employment) with the selected one or more attributes of the element of the second business object model (i.e., the root node of the Employment business object model). The metadata also includes the foreign key parameters so that the data of the attributes may be retrieved at runtime. With respect to the present example, creation of the metadata at S550 results in the display of the attribute CountryCode in conjunction with the UI element Employment in window 820.

As mentioned above, process 500 may be slightly altered to define an intra-business object association according to some embodiments. For example, the second business object model determined at S530 may be identical to the first business object model. Therefore, the foreign key parameters defined at S540 will associate an attribute of the first business object model with another attribute of the first business object model. Additionally, S550 may comprise reception of an instruction to bind an element of the UI component model to one or more attributes of an element (e.g., a sub-item) of the first business object model.

Figure 9:
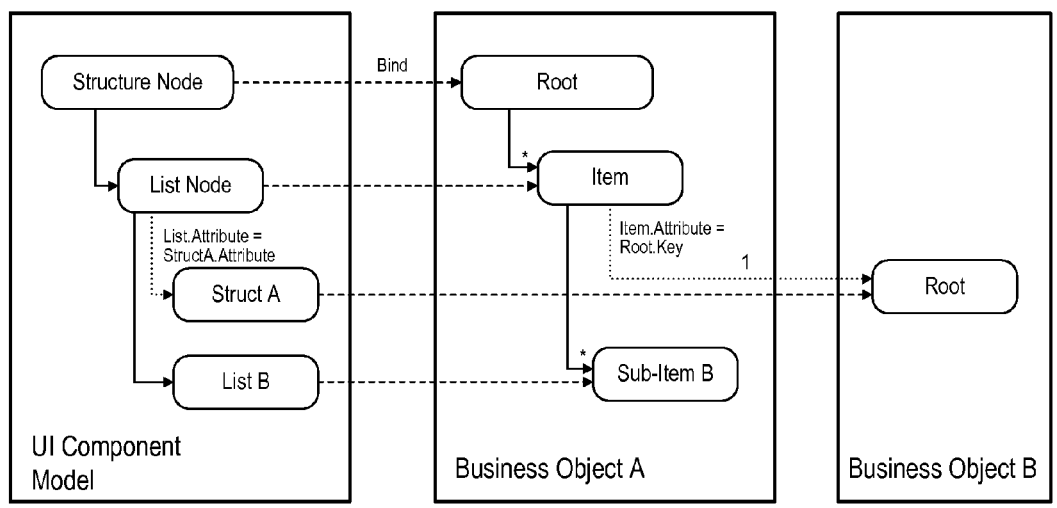
FIG. 9 is a block diagram illustrating a cross-business object association modeled within a UI component model according to some embodiments.

FIG. 9 is a block diagram illustrating process 500 according to some embodiments. As shown, the UI component data model indicates a binding to nodes of Business Object A. Node data of the root node of Business Object B is also to be included in structure "Struct A" of the UI component model. Struct A is a child of List Node, which in turn binds to Item node of Business Object A. The Item node of Business Object A, as defined in the business object model, does not contain an association to the root node of Business Object B, but includes an attribute (e.g., UUID) which matches a key (e.g., EmployeeUUID) of the root node. Foreign key parameters may therefore be defined in the UI component model, which describe a foreign key relationship from Item.Attribute of Business Object A to Root.Key of Business Object B. The attribute and the key are attributes in the UI component model, in that attributes of the UI component model bind to respective BO node attributes (e.g., List.Attribute binds to Item.Attribute and StructA.Attribute binds to Root.Key). The foreign key relationship thereby creates a virtual association between Business Object A and Business Object B in the UI component model.

During a read of the UI component mode, the tree of the referred Business Object is traversed and UI backend 140 propagates the virtual association to service layer 110, which will then evaluate the foreign key information and provide the association and the corresponding data of the associated element (e.g., the root node of Business Object B). In the case of intra-business object associations, role information is supplied to service layer 110 by means of an attribute of the target node which matches a constant value.

Figure 10:
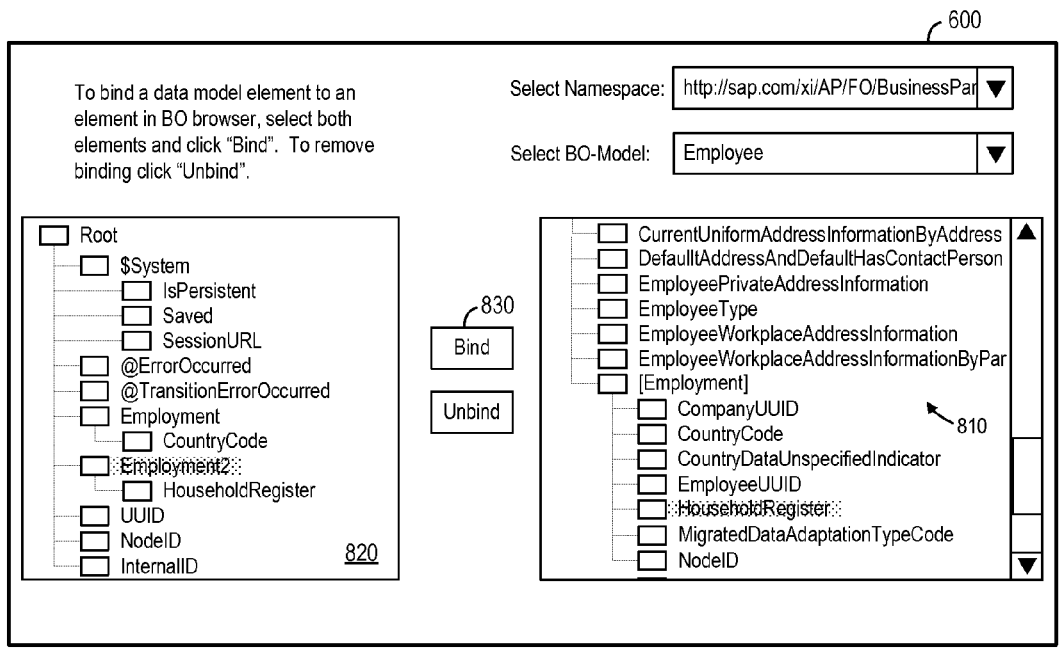
FIG. 10 illustrates a user interface for using a cross-business object association within a UI component model to some embodiments.

FIG. 10 illustrates user interface 600 to depict re-use of the association created as described above. As shown in window 820, UI element Employment2 has been created and selected. The user has also selected the attribute HouseholdRegister of tree 810 and Bind control 830.

Metadata associating the UI element (i.e., Employment2) with the selected attribute (i.e., HouseholdRegister) of the element of the second business object model (i.e., the root node of the Employment business object model) is therefore created as described with respect to S550. The metadata also includes the same foreign key parameters so that the data of the selected attribute may be retrieved at runtime. Moreover, creation of the metadata at S550 results in the display of the attribute HouseholdRegister in conjunction with the UI element Employment2 in window 820.

Figure 11:
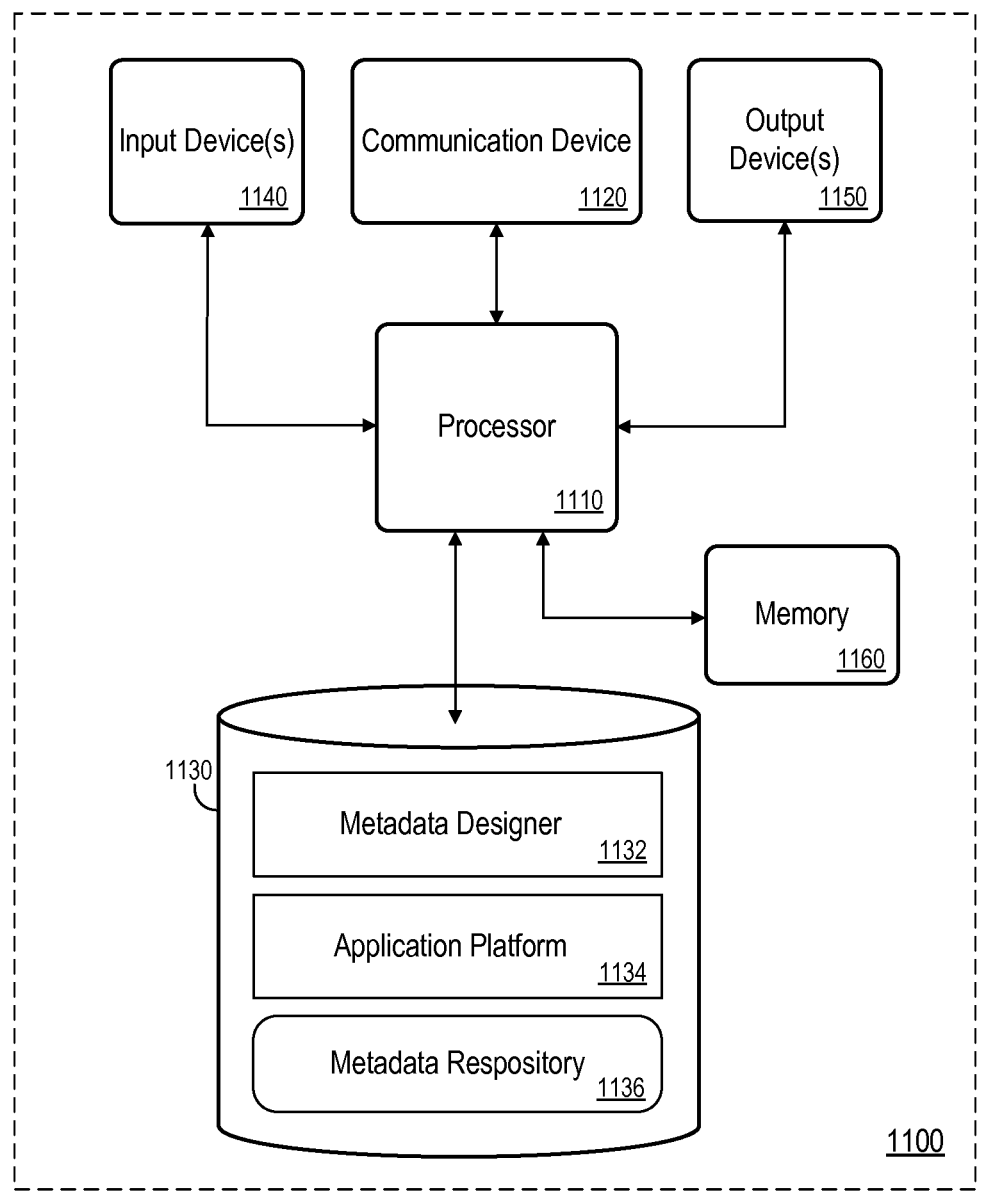
FIG. 11 is a block diagram of a computing device according to some embodiments.

FIG. 11 is a block diagram of apparatus 1100 according to some embodiments. Apparatus 1100 may comprise a general-purpose computing apparatus and may execute program code to perform any of the functions described herein. Apparatus 1100 may include other unshown elements according to some embodiments.

Apparatus 1100 includes processor 1110 operatively coupled to communication device 1120, data storage device 1130, one or more input devices 1140, one or more output devices 1150 and memory 1160. Communication device 1120 may facilitate communication with external devices, such as a reporting client, or a data storage device. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM).

Program code of metadata designer 1132 and backend service layer 1134 may be executed by processor 1110 to cause apparatus 1100 to perform any one or more of the processes described herein. Embodiments are not limited to execution of these processes by a single apparatus. Metadata repository 1136 is also stored in data storage device 1130, and may include program code as well as database tables and other elements as described with respect to architecture 100. Data storage device 1130 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The embodiments described herein are solely for the purpose of illustration. Those in the art will recognize other embodiments may be practiced with modifications and alterations limited only by the claims.

What is claimed is:

1. A non-transitory computer-readable medium storing program instructions executable by a processor of a computing system to:
   receive instruction from a user to create a user-customized virtual association between a first user-selected element and a second user-selected element of one or more business object models of a UI component model;
   determine a node of a first business object model of the virtual association;
   determine a second business object model node of the virtual association;
   define foreign key parameters in the UI component model describing a foreign key relationship associating a user-selected attribute of the first business object model node with a user-selected attribute of an element of the second business object model node, wherein the foreign key relationship defines the virtual association;
   propagate the virtual association to a service layer configured to evaluate the foreign key relationship and provide corresponding data of the associated elements; and
   create metadata in the UI component model associating the element of the UI component model with the second attribute of the element of the second business object model, the metadata comprising the foreign key parameters.

2. The medium according to claim 1, the program instructions further executable by a processor of a computing system to:
   receive a second instruction to bind a second element of the UI component model to a third attribute of the element of the same business object model; and
   create second metadata in the UI component model associating the second element of the UI component model with the third attribute of the element of the same business object model, the second metadata comprising the foreign key parameters.

3. The medium according to claim 1, wherein the element of a UI component model comprises a data structure.

4. The medium according to claim 1, wherein the element of a UI component model comprises a data list.

5. The medium according to claim 1, the program instructions further executable by a processor of a computing system to:
   receive a second instruction to bind a second element of the UI component model to a third attribute of the element of the second business object model; and
   create second metadata in the UI component model associating the second element of the UI component model with the third attribute of the element of the second business object model, the second metadata comprising the foreign key parameters.

6. A computing system comprising:
   a memory storing processor-executable program instructions; and
   a processor to execute the processor-executable program instructions to cause the system to:
   receive instruction from a user to create a user-customized virtual association between a first user-selected element and a second user-selected element of one or more business object models of a UI component model;
   determine a node of a first business object model of the virtual association;
   determine a second business object model node of the virtual association;
   define foreign key parameters in the UI component model describing a foreign key relationship associating a user-selected attribute of the first business object model node with a user-selected attribute of an element of the second business object model node, wherein the foreign key relationship creates the virtual association;
   propagate the virtual association to a service layer configured to evaluate the foreign key relationship and provide corresponding data of the associated elements; and
   create metadata in the UI component model associating the element of the UI component model with the second attribute of the element of the second business object model, the metadata comprising the foreign key parameters.

7. The system according to claim 6, the processor to execute the processor-executable program instructions to cause the system to:
   receive a second instruction to bind a second element of the UI component model to a third attribute of the element of the same business object model; and
   create second metadata in the UI component model associating the second element of the UI component model with the third attribute of the element of the same business object model, the second metadata comprising the foreign key parameters.

8. The system according to claim 6, wherein the element of a UI component model comprises a data structure.

9. The system according to claim 6, wherein the element of a UI component model comprises a data list.

10. The system according to claim 6, the processor to execute the processor-executable program instructions to cause the system to:
    receive a second instruction to bind a second element of the UI component model to a third attribute of the element of the second business object model; and
    create second metadata in the UI component model associating the second element of the UI component model with the third attribute of the element of the second business object model, the second metadata comprising the foreign key parameters.

11. A method implemented by a computing system in response to execution of program instructions by a processor of the computing system, the method comprising:
    receiving instruction from a user to create a user-customized virtual association between a first user-selected element and a second user-selected element of one or more business object models of a UI component model;

determining a node of a first business object model of the virtual association;

defining the virtual association to be one of an intra-business object association and a cross-business object association;

determining a second business object model node of the virtual association;

defining foreign key parameters in the UI component model describing a foreign key relationship associating a user-selected attribute of the first business object model node with a user-selected attribute of an element of the second business object model node, wherein the foreign key relationship defines the virtual association;

propagating the virtual association to a service layer configured to evaluate the foreign key relationship and provide corresponding data of the associated elements; and creating metadata in the UI component model associating the element of the UI component model with the second attribute of the element of the second business object model, the metadata comprising the foreign key parameters.

12. The method according to claim 11, further comprising:
receiving a second instruction to bind a second element of the UI component model to a third attribute of the element of the same business object model; and creating second metadata in the UI component model associating the second element of the UI component model with the third attribute of the element of the same business object model, the second metadata comprising the foreign key parameters.

13. The method according to claim 11, wherein the element of a UI component model comprises a data structure.

14. The method according to claim 11, wherein the element of a UI component model comprises a data list.

15. The method according to claim 11, the program instructions further executable by a processor of a computing system to:

receive a second instruction to bind a second element of the UI component model to a third attribute of the element of the second business object model; and create second metadata in the UI component model associating the second element of the UI component model with the third attribute of the element of the second business object model, the second metadata comprising the foreign key parameters.

* * * * *